Nov. 26, 1946. W. R. NEW 2,411,552
TURBINE APPARATUS
Filed Jan. 20, 1943
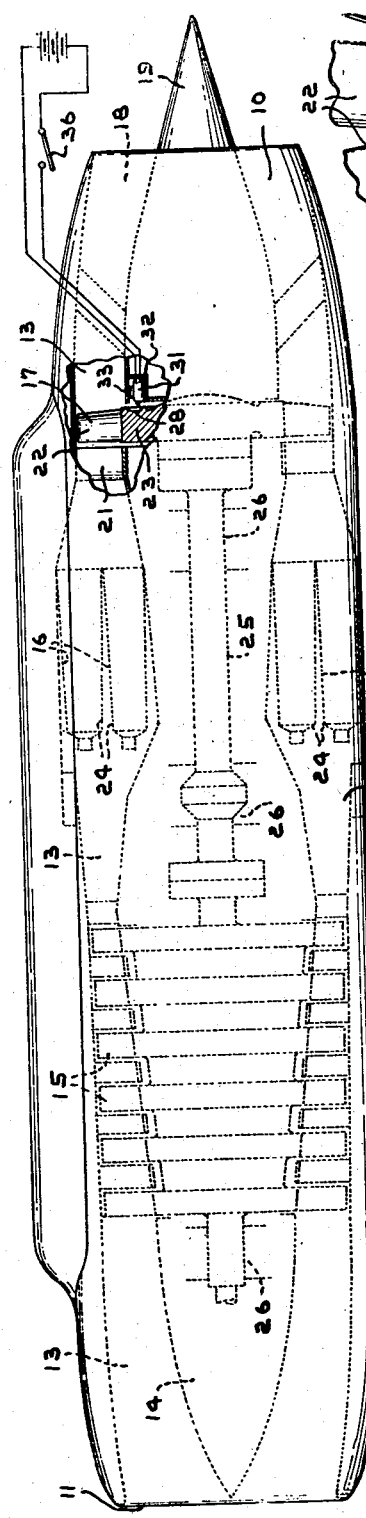
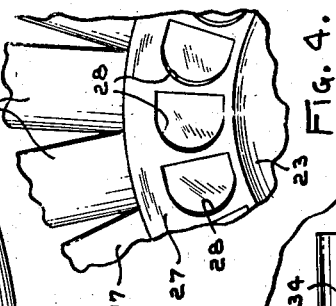
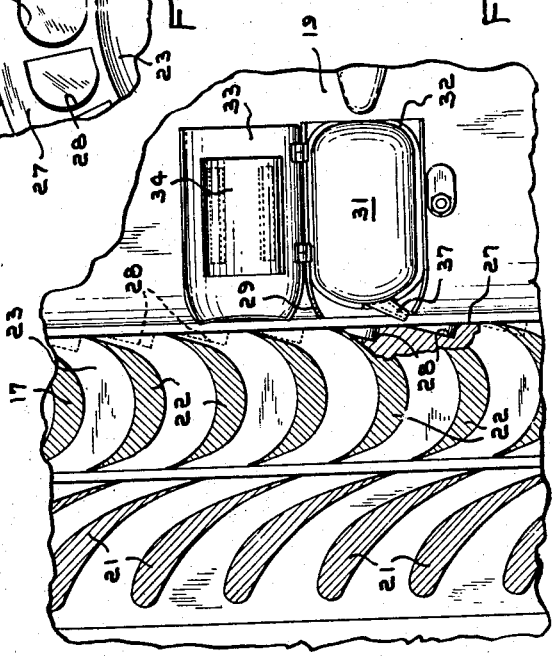
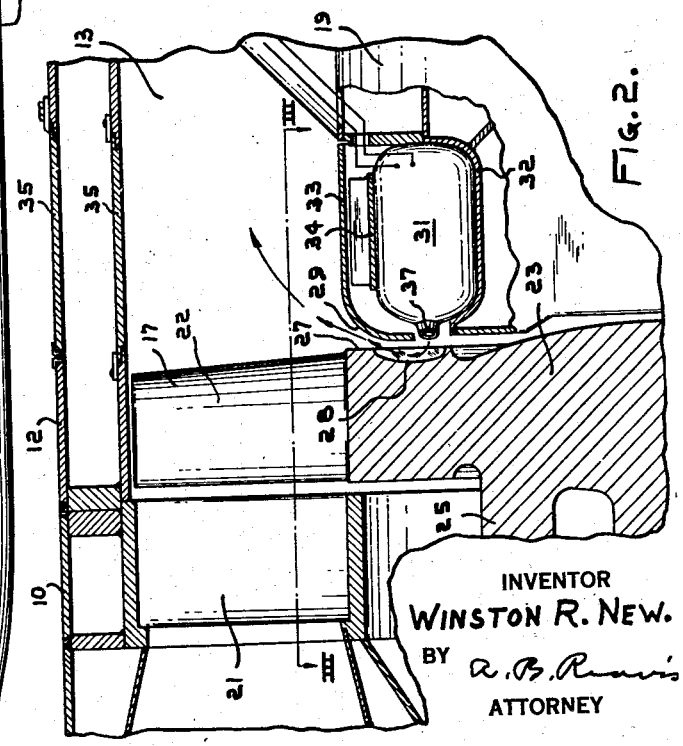
INVENTOR
WINSTON R. NEW.
BY
ATTORNEY Patented Nov. 26, 1946

2,411,552

UNITED STATES PATENT OFFICE 2,411,552

TURBINE APPARATUS

Winston R. New, Springfield, Pa., assignor to Westinghouse Electric Corporation, East Pittsburgh, Pa., a corporation of Pennsylvania Application January 20, 1943, Serial No. 472,955

2 Claims. (Cl. 60—49)

This invention relates to power plants and particularly to a gas turbine power plant which may be used for effecting propulsion of aircraft.

In order to propel aircraft at high speeds, it has been proposed to employ a power plant functioning on the nonregenerative Joule cycle. Such a power plant may include an air compressor, a combustion apparatus, and a gas turbine compactly arranged in series to keep the weight, overall length and diameter of the unit at a minimum. These parts are mounted centrally within and supported by an outer casing of streamline form which directs the flow of air through the power plant.

The turbine is driven by the hot gases provided by the compressor and combustion apparatus and extracts at least sufficient power from these gases to drive the compressor. The remainder of the available power may be utilized to propel the aircraft by ejecting the air rearwardly of the turbine.

Since the power plant relies on the power supplied by the turbine to operate the air compressor and fuel pumps, the power plant is not self-starting and some means must be provided for initially rotating the turbo-compressor shaft.

It is accordingly an object of the invention to provide an improved starting arrangement for a power plant of the character mentioned.

These and other objects are effected by the invention as will be apparent from the following description and claims taken in connection with the accompanying drawing, forming a part of this application, in which:

Fig. 1 is a side elevational view of a power plant in which the present invention is incorporated, with a portion of the outer casing structure broken away;

Fig. 2 is an enlarged view of the exposed portion of Fig. 1;

Fig. 3 is a sectional view taken substantially on the line III—III of Fig. 2; and Fig. 4 is a face view of a portion of the turbine rotor showing the starting turbine buckets formed therein.

The power plant shown in Fig. 1 and generally indicated 10 is adapted to be mounted in or on the fuselage or wings of an airplane with the left or intake end 11, as viewed in this figure, pointed in the direction of flight.

The plant comprises an outer shell or casing structure 12 providing an air duct 13 extending fore and aft with respect to the aircraft. This casing has mounted therein, along its longitudinal axis, a nose portion 14 in which fuel and lubricating oil pumps and ignition apparatus may be supported, an axial flow compressor 15, combustion apparatus generally indicated 16, a turbine 17 and a nozzle 18 defined by the casing 12 and a tailpiece 19 mounted concentrically therein, effective to provide a propulsion jet.

Air enters at the intake end 11, flows through the compressor 15 where it is compressed, and into the combustion apparatus where it is heated. The heated compressed air on leaving the combustion apparatus is directed by suitable guide vanes or nozzles 21 against the blades 22 carried by the turbine disc 23 and then discharged through the propulsion nozzle 18.

The combustion apparatus 16 may be of any suitable construction and is here shown as comprising a plurality of flared tubes 24 arranged circularly within the casing. These tubes may be provided with openings (not shown) in the side walls thereof through which the compressed air supplied by the compressor may enter and mix with fuel oil or the like supplied to the burners. Suitable ignition means (not shown) for igniting the fuel and air mixture, may be provided for each burner.

The present invention is not limited to the details or arrangement of the structure thus far described but is primarily concerned with means for starting the power plant.

The rotor of the compressor 15 and the turbine disc 23 are mounted on a shaft 25 journaled in suitable bearings, generally indicated 26, supported by the outer casing structure 12.

The downstream face 27 of the turbine disc 23 is provided with a circular series of buckets 28 disposed adjacent the periphery thereof and into which a high velocity gas is discharged for starting purposes. The buckets are formed in the rim portion of the disc and they are spaced circumferentially to provide wall thickness between adjacent cavities or buckets adequate to withstand suddenly applied high temperatures.

The buckets are preferably shaped as shown particularly in Figs. 2, 3, and 4, so that the hot gas is turned through an angle somewhat less than 180° and discharged rearwardly through the nozzle 18 as indicated by the arrows in Fig. 2. To prevent the escape of starting gaseous products from fouling or otherwise deteriorating the contiguous structure, the corner of the tailpiece may be cut back slightly, as indicated at 29.

It is proposed to employ a cartridge 31 preferably containing powder which will burn progressively without detonation, thereby generating rather slowly a large volume of gas at a relatively high temperature and pressure. In the embodiment of the invention illustrated, the cartridge is shown as mounted in the tailpiece 19 of the power plant, although it is to be understood that the invention is not limited to this particular location or orientation. As shown, the cartridge 31 is mounted in a suitable holder 32 built into the tailpiece 19 and it is held in place by means of a hinged cover 33 provided with a clamping plate 34, access to the cover for cartridge replacement being had through covered hand holes 35 provided in the outer casing structure 12.

The cartridge may be fired in any desired manner, as for example, by electrical means controlled by a switch 36.

While a suitable nozzle may be provided in any desired manner, it is preferred to employ a cartridge comprising a strong jacket having a nozzle 37 formed in one end thereof.

To start the power plant, the cartridge 31 is fired and the gases which are generated therein are directed by the nozzle 37 into the buckets 28 to rotate the turbine disc. The charge of the cartridge should be adequate to operate the turbine until the heated and compressed motive fluid provided by apparatus driven thereby may operate it.

While a single cartridge holder 32 has been shown, requiring the cartridge 31 to be replaced each time the power plant is to be started, it is to be understood that a plurality of holders may be provided, if desired, permitting one or more cartridges to be fired simultaneously for starting. Further, by providing a plurality of cartridge holders, the turbine may be started several times before replacing the cartridges.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination with a gas turbine power plant comprising a stator and a rotor with the rotor including a disc carrying the last row of blades of axial-flow blading and the stator including inner and outer structures providing an axial-flow annular passage for gases exhausting from said blades, starting means for the plant comprising an annular row of lateral buckets formed in said disc at the exhaust side thereof and directed so as to be effective, when supplied with motive fluid, to turn the rotor in the same direction as it is turned by said blading, a nozzle for supplying motive fluid to said buckets, a motive fluid generator for said nozzle including a cartridge adapted to contain an explosive charge and means for firing the charge, and a holder providing a pocket within the confines of said structures for retaining a cartridge in position for supplying motive fluid to the buckets, said holder including part or parts which are movable to open the pocket to the exterior of said outer structure to provide for insertion and removal of a cartridge and means accessible from the exterior of the outer structure for detachably connecting the part or parts to said structure or structures.

2. In combination with a gas turbine power plant comprising a stator and a rotor with the rotor including a disc carrying the last row of blades of axial-flow blading and the stator including inner and outer structures providing an axial-flow annular passage for gases exhausting from said blades, said inner structure being arranged in juxtaposed and radially overlapping relation with respect to the disc at the exhaust side thereof so that the annular passage constitutes a continuation of the blading flow passage, starting means for the plant comprising an annular row of lateral buckets formed in said disc at the exhaust side thereof and directed so as to be effective, when supplied with motive fluid, to turn the rotor in the same direction as it is turned by said blading, a nozzle carried by said inner structure and disposed radially inward from the inner boundary surface of said annular passage for supplying motive fluid at high velocity to said buckets, a container for an explosive charge in communication with the nozzle, and means for igniting the explosive charge in the container to provide motive fluid for the buckets.

WINSTON R. NEW.